United States Patent [19]
Jolivet et al.

[11] Patent Number: 4,982,126
[45] Date of Patent: Jan. 1, 1991

[54] AUXILIARY BEARING HAVING A GRAPHITE STATOR FOR A ROTARY SHAFT MOUNTED ON MAGNETIC BEARINGS

[75] Inventors: Jean Jolivet, Gasny; Helmut Habermann, Vernon, both of France

[73] Assignee: Societe de Mecanique Magnetique S.A., Saint-Marcel, France

[21] Appl. No.: 332,612

[22] Filed: Mar. 31, 1989

[30] Foreign Application Priority Data

Apr. 29, 1988 [FR] France .................. 88 05818

[51] Int. Cl.$^5$ .............................................. H02K 5/16
[52] U.S. Cl. ..................................... 310/90; 310/90.5; 384/399; 384/907.1
[58] Field of Search ............... 310/90.5, 90, 254, 261; 384/97, 98, 100, 124, 398, 399, 415, 907.1

[56] References Cited

U.S. PATENT DOCUMENTS

| | | | |
|---|---|---|---|
| 1,464,569 | 8/1923 | Guptill | 384/907.1 |
| 2,086,787 | 6/1937 | Whiteley | |
| 2,921,533 | 1/1960 | Williams | 384/97 |
| 3,411,706 | 11/1968 | Woollenweber | |
| 4,063,786 | 12/1977 | Rall | |
| 4,277,111 | 7/1981 | Gray | 384/124 |
| 4,626,754 | 12/1986 | Habermann | 310/90.5 |
| 4,629,261 | 12/1986 | Eiermann | 310/90 |
| 4,795,273 | 1/1989 | Henriksson | 384/97 |

FOREIGN PATENT DOCUMENTS

| | | |
|---|---|---|
| 1070452 | 6/1960 | Fed. Rep. of Germany. |
| 1575651 | 1/1970 | Fed. Rep. of Germany. |
| 1675105 | 7/1971 | Fed. Rep. of Germany. |
| 2203381 | 8/1973 | Fed. Rep. of Germany ...... 384/124 |
| 2336488 | 2/1975 | Fed. Rep. of Germany. |
| 2933942 | 3/1981 | Fed. Rep. of Germany. |

Primary Examiner—R. Skudy
Attorney, Agent, or Firm—Ladas & Parry

[57] ABSTRACT

The auxiliary bearing comprises a chromium steel rotor (2) mounted on the rotary shaft (1), a graphite stator (3) mounted on the frame (5) and disposed to face the rotor (2) and to leave clearance relative thereto which is narrower than the air gap in the magnetic bearings which constitute the main supports of the rotary shaft, a network (4) of liquid feed channels opening out into the empty space between the rotor (2) and the stator (3), and selective control means for controlling the supply of liquid through said network of feed channels. The auxiliary bearing may be of the radial clearance type or of the axial clearance type.

11 Claims, 2 Drawing Sheets

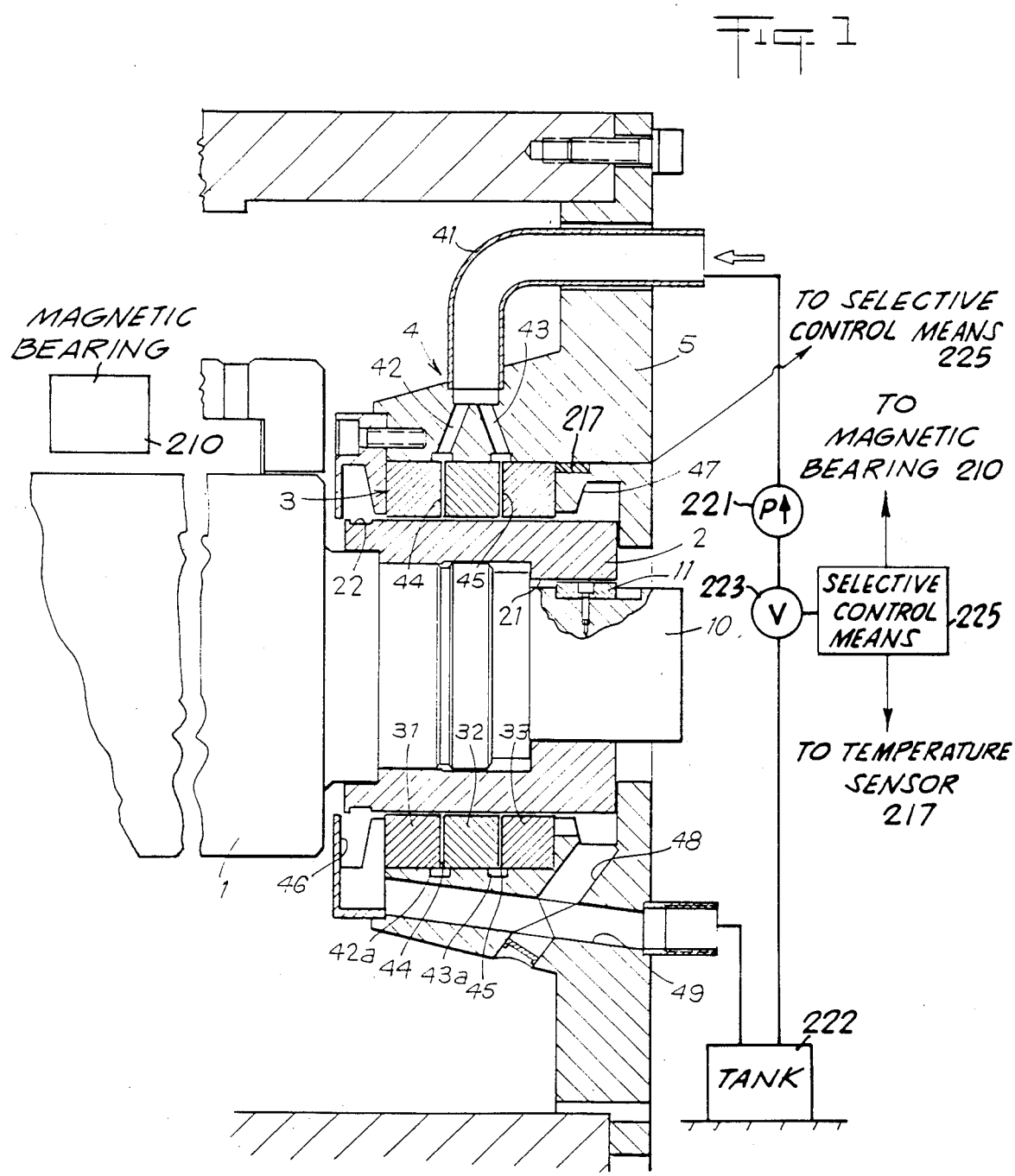

AUXILIARY BEARING HAVING A GRAPHITE STATOR FOR A ROTARY SHAFT MOUNTED ON MAGNETIC BEARINGS

The present invention relates to an auxiliary bearing having a graphite stator for a rotary shaft mounted on magnetic bearings inside a frame.

BACKGROUND OF THE INVENTION

In most applications where a rotary shaft is suspended by means of an active magnetic suspension servo-controlled on the basis of sensors for detecting the position of the rotary shaft, auxiliary bearings, also known as emergency bearings, and generally in the form of ball bearings or roller bearings are provided in order to support the shaft while the machine is being stopped or in the event of a failure of the magnetic suspension, thereby preventing direct contact between the magnetic circuits of the rotors and the stators of the magnetic bearings when the windings of the stator electromagnets are no longer powered, thus avoiding damage to the laminations thereof. In normal operation, auxiliary bearings leave clearance about the rotary shaft and do not themselves rotate. The clearance provided for the auxiliary bearings is generally about one half the width of the air gap of the magnetic bearings.

Conventional emergency bearings used in the event of failure in the magnetic suspension may be mounted either on the rotary shaft while leaving clearance between the outer ring of the bearings and the stator, or else on the frame while leaving clearance between the inner ring of the bearings and the rotor. In either case, whenever a rotating portion lands on the fixed portion of the bearing, motion is not always stable and very high stresses may be applied to the cages or rolling components of the emergency bearings which are consequently often damaged. As a result, emergency bearings need frequent replacement and this increases maintenance costs.

The present invention seeks to remedy the above-mentioned drawbacks and to provide an auxiliary bearing for a rotary shaft mounted on magnetic bearings making it possible in the event of the magnetic suspension failing or stopping to receive the rotary shaft without inducing significant disturbance to the motion of the shaft during landing and without the auxiliary bearing being subjected to rapid wear or destruction.

The invention also seeks to provide an auxiliary bearing whose structure is simple and which is easy to mount.

SUMMARY OF THE INVENTION

These objects are achieved by means of a graphite stator auxiliary bearing for a rotary shaft mounted on magnetic bearings inside a frame, the auxiliary bearing comprising a chromium steel rotor mounted on the rotary shaft, a graphite stator mounted on the frame and disposed facing the rotor leaving clearance which is narrower than the air gap in the magnetic bearings constituting the main supports of the rotary shaft, a network of liquid feed channels opening out into the empty space provided between the rotor and the stator, and selective control means for selectively controlling the feed of liquid through said network of feed channels.

In a first possible embodiment, the bearing is of the type having radial clearance and it comprises a rotor in the form of a chromium steel sleeve mounted on a length of the rotary shaft, and a stator constituted by at least one ring of graphite disposed concentrically about the rotor, with the liquid feed channels opening out radially into the empty space constituting the clearance in a plurality of zones distributed around the ring.

By way of example, the stator may comprise at least three graphite rings juxtaposed in the axial direction and mounted concentrically about the rotor, with the liquid feed channels opening out into the empty space via interstices provided between the various rings of the stator.

Lubrifying liquid recovery grooves may advantageously be formed around the stator in the frame close to the ends of the sleeve-shaped rotor.

In another possible embodiment the bearing is of the axial clearance type and it comprises a rotor constituted by a plane disk of chromium steel extending perpendicularly to the rotary shaft and mounted thereon, and a stator comprising at least three plane bearing surfaces made of graphite mounted on the frame and facing the plane disk of the rotor in a common plane perpendicular to the rotary shaft, with the liquid feed channels opening out axially into the empty space of the bearing clearance in a plurality of zones distributed around the axis of the rotor and situated in the immediate proximity of those sides of the plane bearing surfaces which are closest to the axis of the rotor.

The selective control means for controlling the feed of liquid through the network of feed channels may advantageously be provided with devices which respond to the loss of power to the magnetic bearings in order to switch on the feed of liquid.

In a variant embodiment, or in addition, the selective control means for controlling the feed of liquid through the network of feed channels are provided with temperature detectors disposed in the vicinity of the graphite stator in order to detect the temperature thereof and to switch on the feed of liquid when the stator rises to a predetermined temperature.

When it is desired that the rotary shaft should continue rotation at reduced speed after landing on auxiliary bearings of the invention, and in order to reduce the quantity of liquid required, the bearing may include means for recovering the liquid injected into the empty space in the bearing and a pump for recirculating the recovered liquid in order to reinject it into a supply or directly into the network of feed channels.

BRIEF DESCRIPTION OF THE DRAWINGS

Embodiments of the invention are described by way of example with reference to the accompanying drawings, in which:

FIG. 1 is an axial section view through an embodiment of an auxiliary bearing in accordance with the invention and having radial clearance;

DETAILED DESCRIPTION

Figure 3:
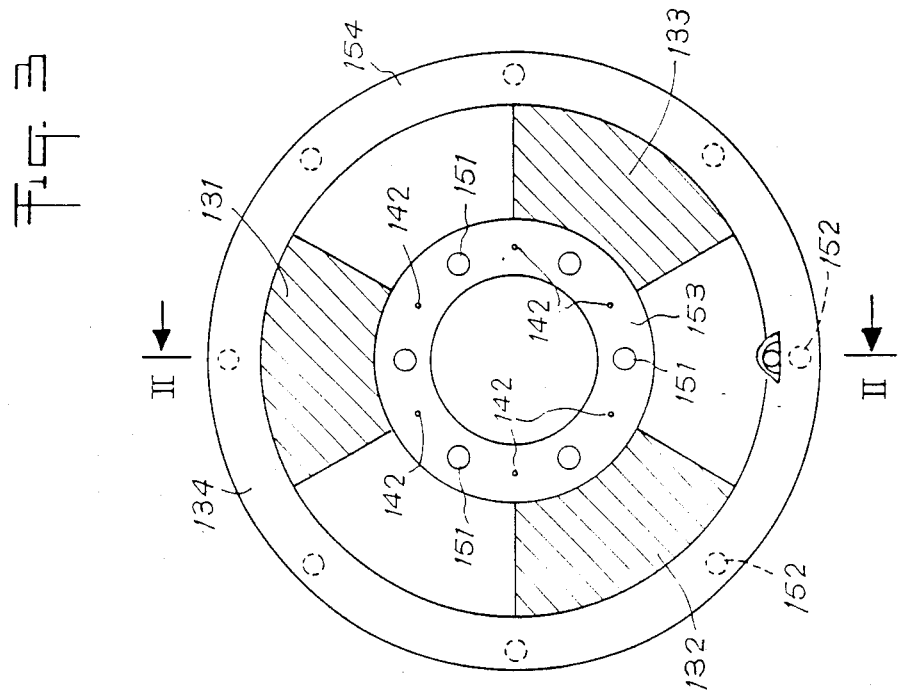
FIG. 3 is a section view on plane III—III of FIG. 2 providing a front view of the stator of the FIG. 2 auxiliary bearing.

FIG. 1 shows an auxiliary bearing having radial clearance disposed around an end portion 10 of a rotary shaft 1 mounted in a frame 5 by means of a conventional active magnetic bearing 210. In FIG. 1, the auxiliary bearing is mounted on the end portion 10 of the rotary shaft 1, which portion is of reduced cross-section.

The auxiliary bearing of the invention comprises a chromium steel rotor 2 constituted by a sleeve mounted on the end portion 10 of the rotary shaft 1 and constrained to rotate therewith by means of at least one key-forming element 11 fixed on the end 10 of the rotary shaft and co-operating with a groove 21 formed on the inside of the sleeve 2.

A graphite stator 3 fixed to the frame 5 is constituted by three graphite rings 31, 32, and 33 which are juxtaposed in the axial direction of the shaft 1, which surround the rotor 2, and which leave radial clearance relative thereto, which clearance may be about one tenth of a millimeter across, for example, and which is in any event advantageously about half the size of the air gap in the magnetic bearings.

A network 4 of ducts for feeding lubricating water is provided in the frame 5 and said network terminates in channels 44 and 45 which open into the empty space constituting the clearance between the rotor 2 and the stator 3. The channels 44 and 45 open radially into the annular empty space constituting the clearance of the auxiliary bearing and they are distributed all around the rotor 2. The channels 44, which may be 4 to 8 in number, for example, are disposed between adjacent rings 31 and 32, whereas the channels 45, which may likewise be 4 to 8 in number, are disposed between adjacent rings 32 and 33.

The channels 44 and 45 may be fed from circular grooves 42a and 43a situated around the stator 3 in coincidence with the junctions between the rings 31 and 32 or between the rings 32 and 33, as the case may be. The circular grooves 42a and 43a are themselves fed via two secondary branches 42 and 43 of a main water feed pipe 41 situated above the auxiliary bearing.

It is advantageous to provide lubricating liquid recovery grooves 46 and 47 in the frame 5 on either side of the stator 3 close to the end of the rotor 2. The rotor 2 may itself include a groove 22 at one of its ends in order to prevent the lubricating liquid from flowing axially beyond the auxiliary bearing and to direct the water towards the lubricating liquid recovery grooves 46 and 47. Ducts 48 and 49 are formed in the frame beneath the auxiliary bearing.

The main water feed pipe 41 and, where applicable, the main water drain duct 49 are connected to a supply of water under pressure, namely tank 222 (not shown) which may contain a quantity of water lying in the range of 5 liters to 15 liters, for example.

The auxiliary bearing described above is intended to operate as a landing bearing in the event of failure of the magnetic suspension. The rotor 2 of chromium steel which is smooth then bears against the likewise smooth inside surface of the graphite rings 31, 32, 33 when the rotary shaft is no longer normally suspended by the magnetic bearing. If no other special precautions are taken, this causes the bearing to heat up by virtue of friction between the rotor 2 and the stator 3. This could damage or destroy the auxiliary bearing. However, by virtue of water being injected, which water spreads throughout the empty space between the rotor 2 and the stator 3 under centrifugal force, the friction between the graphite parts and the chromium steel rotor is very small so long as the speed of rotation remains greater than several revolutions per second. Thus, friction is kept very low by injecting water into the auxiliary bearing when it is put into operation and as long as the rotor continues to rotate at a speed greater than several revolutions per second so that the auxiliary bearing does not run the risk of being damaged. When the speed of rotation drops to several revolutions per second, i.e. when it has become very low, the friction increases greatly and the auxiliary bearing stops the shaft from rotating without itself being damaged, given the low speed of rotation at which this occurs.

Selective control means 225 are provided for controlling the feed of liquid via the main feed pipe 41 from the tank of liquid under pressure in order to react to loss of power to the magnetic bearings and switch on liquid feed via the network 4 as soon as the auxiliary bearing is brought into service due to failure of the magnetic suspension. The lubricating water which is injected as soon as the auxiliary bearing rotor 2 comes into contact with the graphite stator 3 greatly reduces the coefficient of friction, thereby preventing the rotor 2 and the stator 3 of the auxiliary bearing from suffering wear or damage.

In a variant, it is possible to omit injecting lubricating water as soon as power is no longer supplied to the magnetic bearings supporting the rotary shaft, and on the contrary to inject lubricating water into the network 4 only after a certain length of time has elapsed from failure of the magnetic suspension, with said time lapse corresponding to the time required for the auxiliary bearing to heat up as a result of the high coefficient of friction, thereby raising the temperature of the component parts of the bearing. It is then possible to cause the water to be injected into the bearing before bearing integrity is affected, on the basis of information delivered by a temperature sensor located in the vicinity of the graphite stator 3. When the temperature sensor(s) 217 detect heating up to a predetermined threshold beyond which the integrity of the auxiliary bearing runs the risk of being affected, then the water injection control means cause the water stored in the tank to be injected.

Temperature sensors 217 may also be used as safety detection means providing redundancy relative to means for detecting a loss of power supply to the magnetic bearings. In this case, water is normally injected as soon as the magnetic bearings lose power, but in the event of a fault in the device for detecting loss of power supply to the magnetic bearings, the temperature sensor(s) nevertheless ensure(s) that water is injected before the auxiliary bearing suffers damage.

In a rotary machine having a rotary shaft weighing several tons, with a normal operating speed of several thousand revolutions per minute, good lubrication can be provided by a flow of several liters of water per minute per bearing. Once radial auxiliary bearings have been put into operation and water has been injected therein after the active magnetic suspension has failed or has been stopped, drive to the rotary shaft of the machine is interrupted and the rotary shaft may come to rest after a period of about 2 to 3 minutes. The quantity of lubricating water required in this case may be about 5 liters per minute.

In some special applications, it is necessary for the rotary shaft to continue rotating at reduced speed for a period of time which may be about 30 minutes, for example, after its auxiliary bearings have been brought into service. In this case, in order to limit the quantity of water that needs to be stored in the tank, it is advantageous to recover the lubricating water flowing out via the duct 49 and to recirculate it by means of a pump 221, either back into the tank or else directly to the inlet of the main feed pipe 41.

The selective control means 225 feeding liquid from the tank through the network 4 of feed ducts may act on a valve 223, e.g. a membrane-bursting type of valve disposed between the tank and the main feed pipe 41.

Figure 2:
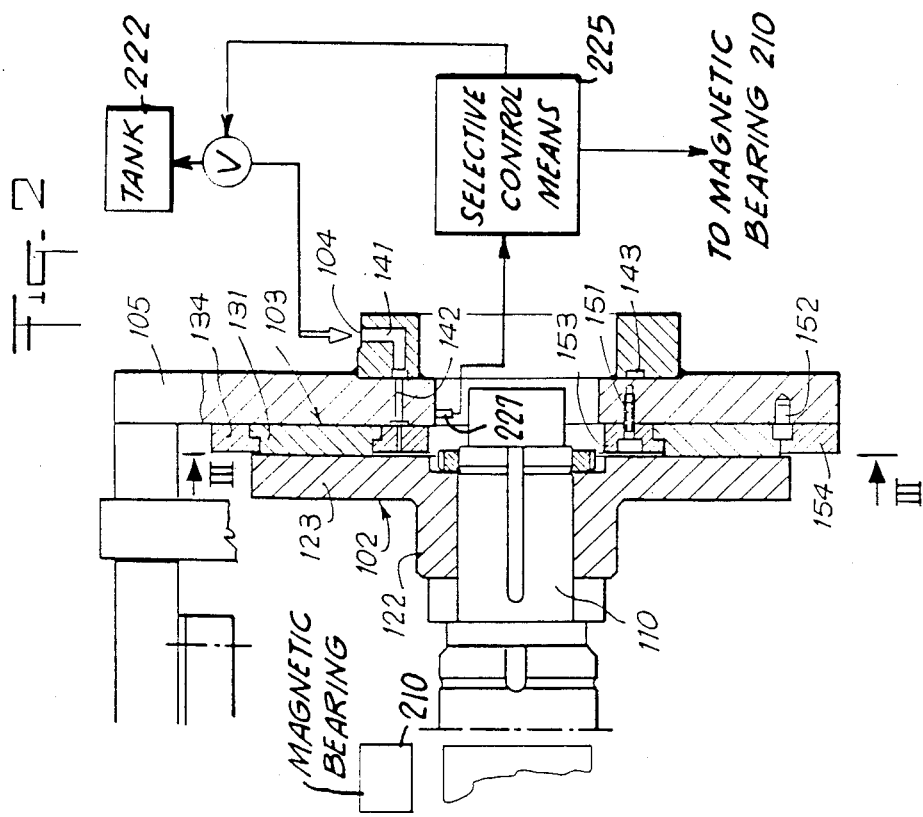
FIG. 2 is an axial section view on a plane II—II of FIG. 3 through an embodiment of an auxiliary bearing in accordance with the invention and having axial clearance.

The invention is also applicable to an auxiliary bearing having axial clearance. FIGS. 2 and 3 show such an auxiliary bearing whose structure and function are similar to those of the auxiliary bearing having radial clearance as shown in FIG. 1, but in which the configuration is naturally different.

The auxiliary bearing in FIGS. 2 and 3 comprises a rotor 102 essentially constituted by a plane disk 123 of chromium steel disposed perpendicularly to the rotary shaft 110. The disk is provided with a central opening and is mounted on the rotary shaft by means of a cylindrical portion 122 constituting a sleeve fixed to the plane disk 123. A stator 103 is mounted on the frame 105 by link elements 151 and 152 situated in a common plane perpendicular to the shaft 110. FIGS. 2 and 3 show plane graphite bearing surfaces 131, 132, 133 in the form of angular sectors which are held in position between an inner first ring 153 and an outer second ring 154 both made of steel and both held in place by the link elements 151 and 152 on a base plate fixed to the frame 105. The bearing surfaces 131, 132, and 133 project slightly forwards from the rings 153 and 154 towards the rotor disk 123.

The water feed network 104 comprises a main water feed channel 141 which opens into an annular channel 143 from which a plurality of channels 142 (6 in the example shown in FIG. 3) run parallel to the ax of the shaft 110, said channels being uniformly distributed around the axis of the shaft 110 and opening into the empty space situated in the vicinity of the internal portions of the graphite bearing surfaces 131, 132, and 133 in order to enable the lubricating water to be spread over the entire area of the bearing surfaces 131, 132, and 133 by centrifugal force.

The feed channels 141, 142, and 143 may be fed with water via the network 104 from tank 222 in a manner which is entirely similar to that described with reference to the embodiment of FIG. 1. The water feed may be selectively controlled in a manner which is entirely similar to that described above.

We claim:

1. An auxiliary bearing for a rotary shaft mounted inside a frame on a magnetic bearing having a predetermined air gap, wherein the auxiliary bearing comprises a chromium steel rotor mounted on the rotary shaft for rotation therewith, a graphite stator mounted on the frame and facing the rotor, an empty space narrower than the air gap in the magnetic bearing being provided between said rotor and said stator, a network of liquid feed channels in said stator and opening into said empty space, and selective control means for selectively controlling feed of liquid through said network of liquid feed channels to said empty space.

2. An auxiliary bearing according to claim 1, wherein said empty space defines a radial clearance between said stator and said rotor, said rotor comprising a chromium steel sleeve mounted on the rotary shaft, said stator comprising at least one ring of graphite disposed concentrically around the rotor, said liquid feed channels opening radially into said empty space in a plurality of zones distributed around said ring.

3. An auxiliary bearing according to claim 2, wherein the stator comprises at least three graphite rings juxtaposed in the axial direction and mounted concentrically around the rotor, and wherein the liquid feed channels open into the empty space via interstices provided between said rings of the stator.

4. An auxiliary bearing according to claim 2, wherein liquid recovery grooves are formed around said stator in the frame proximate the ends of said chromium steel sleeves.

5. An auxiliary bearing according to claim 1, wherein said empty space defines an axial clearance between said stator and said rotor, said rotor comprising a plane disk of chromium steel extending perpendicularly to the rotary shaft and mounted thereon, said stator comprising at least three plane bearing surfaces made of graphite mounted on the frame and facing the plane disk of said rotor in a common plane perpendicular to the rotary shaft, said liquid feed channels opening axially into said empty space in a plurality of zones distributed around the axis of the rotor and situated in the immediate proximity of those sides of said plane bearing surfaces which are closest to the axis of the rotor.

6. An auxiliary bearing according to claim 1, wherein the selective control means for controlling the feed of liquid through the network of liquid feed channels includes means responsive to loss of power to the magnetic bearing (not shown) for switching on the feed of liquid.

7. An auxiliary bearing according to claim 1, wherein the selective control means for controlling the feed of liquid through the network of liquid feed channels includes temperature detectors disposed in the vicinity of the graphite stator in order to detect the temperature thereof and to switch on the feed of liquid when the stator rises to a predetermined temperature.

8. An auxiliary bearing according to claim 1, wherein the lubricating liquid is water.

9. An auxiliary bearing according to claim 1, including means for recovering the liquid injected into the empty space in the bearing and a pump for recirculating the recovered liquid.

10. An auxiliary bearing according to claim 1, including a tank of liquid under pressure disposed on the frame and a valve which is actuated by said selective control means in order to cause the liquid to be fed into the network of liquid feed channels from said tank.

11. An auxiliary bearing according to claim 1, wherein the clearance defined by the empty space between said rotor and said stator of said auxiliary bearing is about one tenth of a millimeter.

* * * * *